(12) United States Patent
Shinohara et al.

(10) Patent No.: US 6,381,435 B2
(45) Date of Patent: Apr. 30, 2002

(54) COLOR IMAGE FORMING APPARATUS

(75) Inventors: Tadashi Shinohara; Yasushi Nakazato; Toshiya Sato; Mitsugu Sugiyama; Nobuo Iwata; Motonori Hanada; Hideo Nakagawa, all of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/734,555

(22) Filed: Dec. 13, 2000

(30) Foreign Application Priority Data

Dec. 13, 1999 (JP) ............................................ 11-352745

(51) Int. Cl.⁷ ............................................. G03G 15/01
(52) U.S. Cl. ......................................... 399/301; 399/49
(58) Field of Search .......................... 399/49, 72, 38, 399/301; 347/115, 116

(56) References Cited

U.S. PATENT DOCUMENTS

| | | | |
|---|---|---|---|
| 5,737,665 A | 4/1998 | Sugiyama et al. | ............ 399/39 |
| 5,765,083 A | 6/1998 | Shinohara | .................... 399/301 |
| 5,799,228 A | 8/1998 | Iwata et al. | .................... 399/94 |
| 5,875,380 A | 2/1999 | Iwata et al. | .................. 399/301 |
| 6,101,359 A * | 8/2000 | Tamura | ...................... 399/301 |
| 6,118,557 A | 9/2000 | Sugiyama et al. | .......... 358/504 |
| 6,142,690 A | 11/2000 | Yoshimura et al. | ...... 400/636.2 |

FOREIGN PATENT DOCUMENTS

| JP | 01-179955 | * | 7/1989 |
|---|---|---|---|
| JP | 6-3886 A | | 1/1994 |
| JP | 2573855 B2 | | 10/1996 |
| JP | 2642351 B2 | | 5/1997 |
| JP | 2765626 B2 | | 4/1998 |
| JP | 10-198110 | | 7/1998 |
| JP | 10-260567 A | | 9/1998 |

* cited by examiner

*Primary Examiner*—Sophia S. Chen
(74) *Attorney, Agent, or Firm*—Oblon, Spivak, McClelland, Maier & Neustadt, P.C.

(57) ABSTRACT

An image forming apparatus includes a plurality of image formation units which print an image of different color on a paper and also form positional deviation detection marks and image density regulation marks, on a conveyer belt or on at least one of a recording medium and an intermediate transfer body that conveys the paper, when such a request is received. When requests for formation of the positional deviation detection marks and the request for the formation of the image density regulation marks is received at the same time or at substantially the same time, the main CPU orchestrates the conveyer belt and the image forming units to form the positional deviation detection marks and the image density regulation marks in continuation.

15 Claims, 13 Drawing Sheets

COLOR IMAGE FORMING APPARATUS

FIELD OF THE INVENTION

The present invention relates to a color image forming apparatus. This color image forming apparatus may be a copying machine, a printer, and a facsimile. The color image forming apparatus may utilize the technology of electro-photography, electro-statics, or may utilize some other technology for forming the image on a paper.

BACKGROUND OF THE INVENTION

Conventionally, a tandem type of color image forming apparatus is known. In this conventional color image forming apparatus, a separate image forming unit for forming an image of a separate color, for example, yellow (hereafter Y), magenta (hereafter M), cyan (hereafter C), and black (hereafter K), respectively, are lined up along a conveyer belt. The conveyer belt conveys the paper, on which the image is to be formed, under each image forming unit. The conventional color image forming apparatus is shown in detail in FIG. 2.

As shown in FIG. 2, in the conventional color image forming apparatus, a plurality of image forming units 1Y, 1M, 1C, and 1K are sequentially disposed along a conveyer belt 3. The conveyer belt 3 is installed over conveyer rollers 4 and 5 so as to move in a direction shown by an arrow in FIG. 2. One roller of the conveyer rollers 4 and 5 also drives the conveyer belt 3 in addition to just moving the conveyer belt 3, and the other roller just moves the conveyer belt 3. A paper feeder comprises a paper feed tray 6. A pile of papers is placed in the paper feed tray 6. A paper 2 on the top of this pile of paper is fed to the conveyer belt 3 by not shown a paper feed roller. The paper 2 sticks to the conveyer belt 3 due to electrostatic adsorption.

The conveyer belt 3 conveys the paper 2 under the Y image forming unit 1Y. At this position, a transfer unit 7Y of the Y image forming unit 1Y forms a Y image (i.e. a yellow color image) on the paper 2. The Y image forming unit 1Y has a drum like photosensitive body 8Y that supports an image, a charging unit 9Y disposed in the periphery of the photosensitive body 8Y for uniformly charging the photosensitive body 8Y, an exposure unit 10Y as an exposure means performing exposure for the photosensitive body 8Y, a development unit 11Y as a development means developing an electrostatic latent image on the photosensitive body 8Y to form a Y toner image, and a photosensitive body cleaner 12Y as a cleaning means cleaning the photosensitive body 8Y.

The photosensitive body 8Y is rotated and driven by a not shown rotation mechanism so as to be charged uniformly by the charging unit 9Y. Then, the photosensitive body 8Y is exposed to a laser light 13Y from the exposure unit 10Y so as to form an electrostatic latent image. This electrostatic latent image on the photosensitive body 8Y is developed by the development unit 11Y so that the Y toner image is formed on the photosensitive body 8Y. This Y toner image on the photosensitive body 8Y is transferred onto the transfer paper 2 on the conveyer belt 3 at a position (a transfer position) where the photosensitive body 8Y and the transfer paper 2 on the conveyer belt 3 come in contact with each other by means of the transfer unit 7Y so that the Y toner image of only the yellow color is formed on the paper 2. After the transfer of the Y toner image is completed, the photosensitive body 8Y is prepared for the next image formation while unnecessary toner remaining on the surface is cleaned by the photosensitive body cleaner 12Y.

The paper 2 having the Y image formed thereon is then brought under the M image forming unit 1M by moving the conveyer belt 3. At this position, a transfer unit 7M of the M image forming unit 1M forms an M image (i.e. a magenta color image) over the already formed Y image. Then, the paper 2 having the Y image and M image formed thereon is brought under the C image forming unit 1C by moving the conveyer belt 3. At this position, a transfer unit 7C of the C image forming unit 1C forms an C image (i.e. a cyan color image) over the already formed Y image and M image. Then, the paper 2 having the Y image, M image, and C image formed thereon is brought under the K image forming unit 1K by moving the conveyer belt 3. At this position, a transfer unit 7K of the K image forming unit 1K forms an K image (i.e. a black color image) over the already formed Y image, M image, and C image. Thus, a full color image is formed on the paper 2. Then, the paper 2 having an image printed thereon is conveyed under a fixing unit 14. The fixing unit 14 fixes the image. Finally, the paper 2 is discharged outside the machine.

The M image forming unit 1M, the C image forming unit 1C, and the K image forming unit 1K have drum like photosensitive bodies 8M, 8C, and 8K as image support bodies, charging units 9M, 9C, and 9K disposed in the peripheries of the photosensitive bodies 8M, 8C, and 8K as charging means for uniformly charging the photosensitive bodies 8M, 8C, and 8K, exposure units 10M, 10C, and 10K as exposure means performing exposure for the photosensitive bodies 8M, 8C, and 8K, development units 11M, 11C, and 11K as development means developing electrostatic latent images on the photosensitive bodies 8M, 8C, and 8K to make an M toner image, a C toner image, and a K toner image, and photosensitive body cleaners 121M, 12C, and 12K as cleaning means cleaning the photosensitive bodies 8M, 8C, and 8K, respectively, similarly to the Y image forming unit 1Y.

In the M image forming unit 1M, the C image forming unit 1C, and the K image forming unit 1K, after the photosensitive bodies 8M, 8C, and 8K are rotated and driven by means of rotation mechanisms which are not shown so as to be uniformly charged with electricity by the charging units 9M, 9C, and 9K, respectively, they are exposed to laser lights 13M, 13C, and 13K corresponding to an M image signal, a C image signal, and a K image signal by the exposure units 10M, 10C, and 10K to form electrostatic latent images, respectively. These electrostatic latent images on the photosensitive bodies 8M, 8C, and 8K are developed by the development units 11M, 11C, and 11K so that the M toner image, the C toner image, and the K toner image are formed on the photosensitive bodies 8M, 8C, and 8K. The M toner image, the C toner image, and the K toner image on the photosensitive bodies 8M, 8C, and 8K are transferred onto the transfer paper 2 on the conveyer belt 3 at the positions (transfer positions) where the photosensitive bodies 8M, 8C, and 8K and the transfer paper 2 on the conveyer belt 3 come in contact with each other by means of the transfer units 7M, 7C, and 7K. After the transfer of the M toner image, the C toner image, and the K toner image are completed, the photosensitive bodies 8M, 8C, and 8K are prepared for the next image formations while unnecessary toner remaining on the surfaces is cleaned by the photosensitive body cleaners 12M, 12C, and 12K.

In the conventional color image forming apparatus it is necessary that the different color images are formed at exact positions. For example, if the positions of the image forming units is not aligned, then the image will get distorted. Therefore, a technique for an alignment between respective colors is a significant issue from the constitutional standpoint. The factors that cause static positional deviation of respective colors mainly include skew, positional deviation of the resist in the sub-scanning direction and main scanning direction, and error in magnification in the main scanning direction.

A skew correction is performed by, for example, regulating the inclination of an optical unit or the inclination of a beam reflection mirror existing therein or the like.

In the color image forming method described in Japanese Patent Application Laid-Open No. HEI 10-198110, detection unit for detecting a positional deviation detection mark formed by a line in a main scanning direction and a line inclined against that line is provided. This detection unit is composed of a slit having an aperture which is parallel to and has the same width as the respective lines of the mark, a light source, and a light receiver.

An image forming apparatus is disclosed in Japanese Patent No. 2642351 in which a standard part composed of a straight line extending on a non-end like conveying means in a main scanning direction and a slanting line extending in a slant manner against the straight line are formed, and a deviation amount of the slanting line in the main scanning direction is calculated through the comparison between an ideal value of the space between the standard part and the slanting line and an actually detected space, so that based on its result at least either of a main scanning write timing clock or write clock is corrected.

An image forming apparatus is disclosed in Japanese Patent No. 2765626 in which a pattern image for measurement is formed on a non-end like conveying means, this pattern image is detected with a detection unit, a deviation between a standard pattern image for one color is and the pattern image of other colors is measured, and the timing of forming the image is adjusted based on the measured deviation in which a pattern image for measuring positional deviations for respective colors is formed on a non-end like conveying means so that this pattern image for measuring is detected by a detection unit, and a deviation amount between a pattern image for measuring one color to be a standard and a pattern image for measuring another color is calculated so that based on the deviation amount, image write timing is regulated.

A multiple image forming apparatus is disclosed in Japanese Patent No. 2573855 in which reading of an alignment pattern for correcting a positional deviation for respective colors and reading of a density pattern for controlling the density of an image are performed by employing the same reading unit commonly.

FIG. 3 shows the detection unit and its peripheral section described in the Japanese Patent Application Laid-Open No. HEI 10-198110. FIG. 4 shows side and enlarged view of the detection unit. The detection unit is composed of a light emitter 15, a slit 16, and a light receiver 17 so as to detect the positional deviation detection mark 25 formed by image forming units 21 to 24 of respective colors on a conveyer belt 20 installed over conveyer rollers 18 and 19. This detection unit is disposed in both ends, respectively, in the main scanning direction, and corresponding to each detection unit, the positional deviation detection mark 25 is formed in both ends of the conveyer belt 20, respectively.

FIG. 5 shows the slit 16 in an enlarged manner. The slit 16 has an aperture 16a with a width "a" which is parallel to a line parallel to the main scanning direction of the positional deviation detection mark 25 (hereafter, referred to as a horizontal line) and a line slanting against that horizontal line (hereafter, referred to as a vertical line) and a length "b" in order to detect the respective horizontal and vertical lines. A detection time difference of each line and a detection result of right/left are compared while taking black horizontal line as a standard in using the horizontal and vertical lines so that depending on the result, corrections of skew, a sub-scanning resist deviation, a main scanning resist deviation, and a main scanning magnification error are performed.

In the image forming apparatuses described in the Japanese Patent Nos. 2642351 and 2765626, a correction based on various kinds of deviation amounts calculated through detection results of the detection unit is performed as follows, similarly to the color image forming method described in the Japanese Patent Application Laid-Open No. HEI 10-198110.

FIG. 6 shows a timing chart of the time when the write timing of the sub-scanning direction is corrected. In this case, the correction resolution is supposes to be one dot. With respect to an image region signal (write enable signal) of the sub-scanning direction, the write position is regulated by the timing of a synchronized detection signal. Now, when it is wanted that the write position is advanced one dot depending on the result of the calculation using a detection result of the detection unit, the write enable signal may be made active one part fast of the synchronized detection signal as shown in FIG. 6.

FIG. 7 shows a timing chart of the time when the write timing of the main scanning direction is corrected. In this case, the correction resolution is supposes to be one dot. With respect to the image write clock, clocks having exactly matched phases can be obtained for respective lines by a rising edge of the synchronized detection signal. Writing of an image is performed, synchronizing that clock signal, and write enable signal of the main scanning direction is made, synchronizing that clock signal. Now, when it is wanted that the write position is advanced one dot depending on the result of the calculation using a detection result of the detection unit, the write enable signal may be made active one clock part fast as shown in FIG. 7.

Further, when the magnification in the main scanning direction is deviated from the standard color as a result of the calculation using a detection result of the detection unit by a color other than the standard color, the magnification of the main scanning direction can be altered by employing a device by which the frequency of the clock can be changed by a very small step, for example, a clock generator or the like.

In the multiple image forming apparatus described in the Japanese Patent No. 2573855, same detection unit detects the alignment mark and the density pattern (image density regulation pattern). In this case, the alignment mark (positional deviation detection mark) 25 shown in FIG. 3 and the image density regulation pattern 26 shown in FIG. 8 are formed individually on the conveyer belt 20 by the image forming units 21 to 24 of respective colors indifferent sequences.

A predetermined arithmetic processing is performed using the detection result of the alignment mark 25, and according to the result, the alignment control as described above is performed. Similarly, a predetermined arithmetic processing is performed using the detection result of the density pattern 26 for regulating an image density, and according to the result, a process condition or the like, such as a laser power, a charge bias, a development bias, or the like, is altered into an optimal value.

In the multiple image forming apparatus described in the Japanese Patent No. 2573855, since the alignment operation in which the detection result of the alignment mark 25 is calculated and in accordance with the result the alignment control is performed and the image density regulation operation in which the detection result of the density pattern 26 is calculated and in accordance with the result a process condition or the like is altered are executed in different sequences, useless time is taken so that a waiting time of a user becomes long.

SUMMARY OF THE INVENTION

It is the first object of the present invention to provide a color image forming apparatus by which a waiting time of a user can be shortened.

It is the second object of the present invention to provide a color image forming apparatus in which a running cost can be reduced.

It is the third object of the present invention to provide a color image forming apparatus by which a waiting time of a user can be shortened.

It is the fourth object of the present invention to provide a color image forming apparatus by which an alignment can be securely performed.

It is the fifth object of the present invention to provide a color image forming apparatus by which an alignment can be securely performed.

The color image forming apparatus according to one aspect of the invention comprises a means forming and detecting the positional deviation detection mark and the image density regulation mark. When requests for image density control and alignment are almost simultaneously received, this means forms and detects the positional deviation detection mark and the image density regulation mark in the sequence the requests were received. Therefore, the time for which the user is required to wait is shortened.

Further, it is preferable that if only a request for image density control is received only the image density regulation mark is detected and if only a request for alignment is received only the positional deviation detection mark is detected. Accordingly, the running cost can be reduced.

Further, it is preferable that the frequency for sampling a detection signal of the image density regulation mark and the frequency for sampling a detection signal of the positional deviation detection mark are different. Furthermore, it is preferable that the frequency for sampling the detection signal of the image density regulation mark is smaller than the frequency for sampling the detection signal of the positional deviation detection mark. Accordingly, the time for which the user is required to wait is shortened.

Further, it is preferable that a detection result of the positional deviation detection mark is discriminated. When the discrimination is impossible, only the image density regulation for each color is performed so that the alignment for each color is not performed. One the other hand, when the discrimination is possible, the image density regulation for each color and the alignment for each color are performed. Accordingly, alignment can be securely performed.

Further, it is preferable that, when the discrimination is impossible, the alignment for each color is performed after the image density regulation for each color is performed. Accordingly, alignment can be securely performed.

Other objects and features of this invention will become apparent from the following description with reference to the accompanying drawings.

DESCRIPTION OF THE PREFERRED EMBODIMENTS

Figure 2:
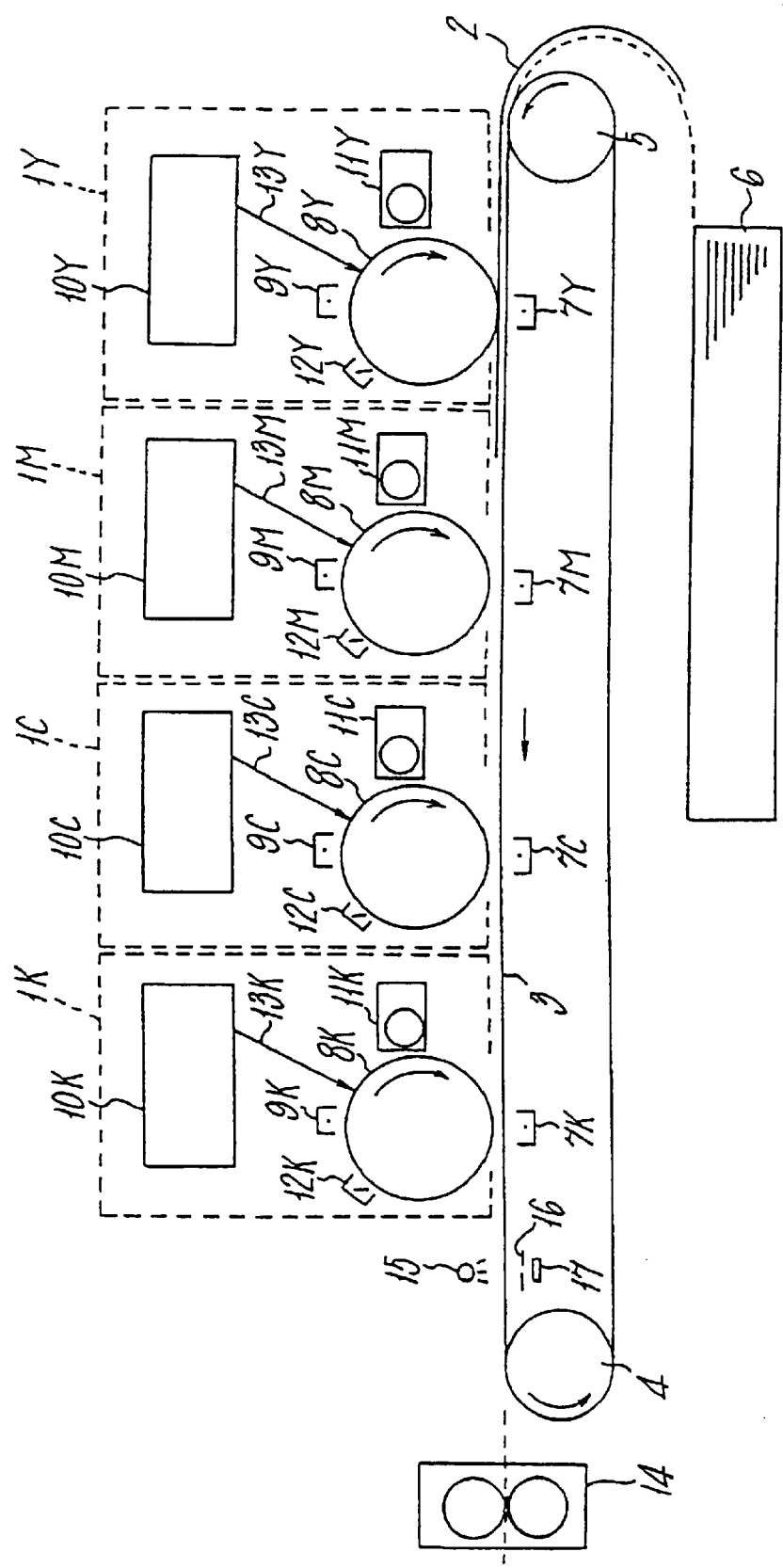
FIG. 2 is an outlined view showing one example of a color image forming apparatus.
Figure 3:
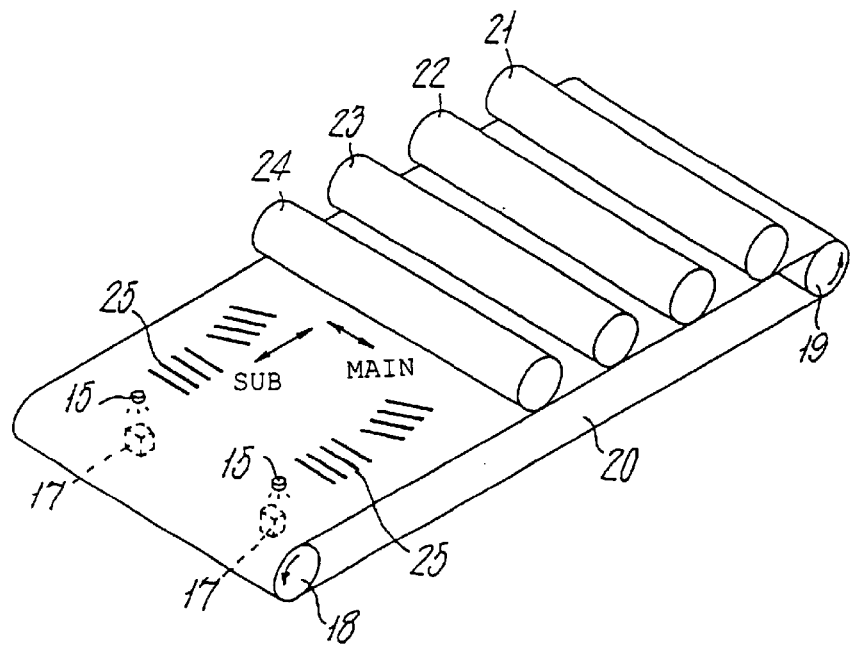
FIG. 3 is a perspective view showing the detection unit and its peripheral section described in the Japanese Patent Application Laid-Open No. HEI 10-198110.
Figure 4:
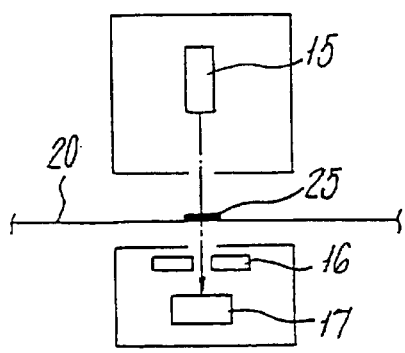
FIG. 4 is an outlined view showing the detection unit in an enlarged manner.
Figure 5:
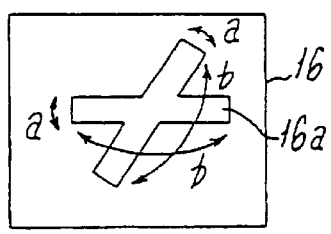
FIG. 5 is a plan view showing the slit of the detection unit in an enlarged manner.
Figure 6:
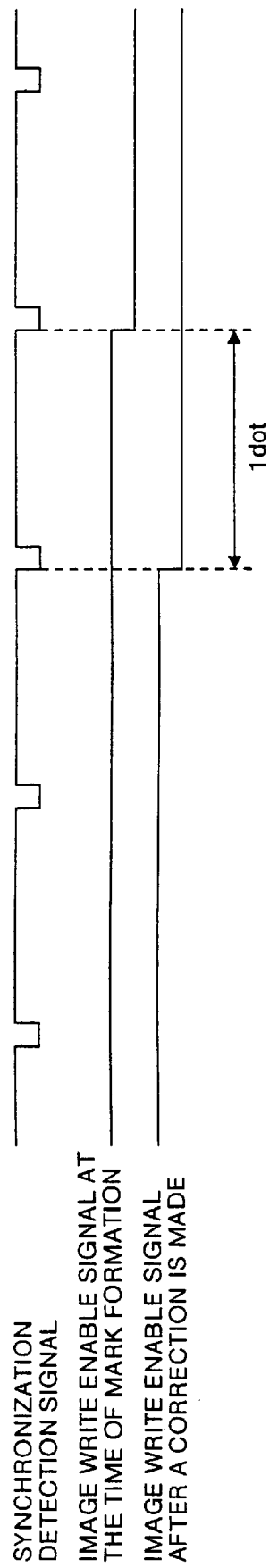
FIG. 6 is a timing chart showing operation timing of the time of correcting the write timing of the sub-scanning direction in the image forming apparatus described in the Japanese Patent Nos. 2642351 and 2765626.
Figure 7:
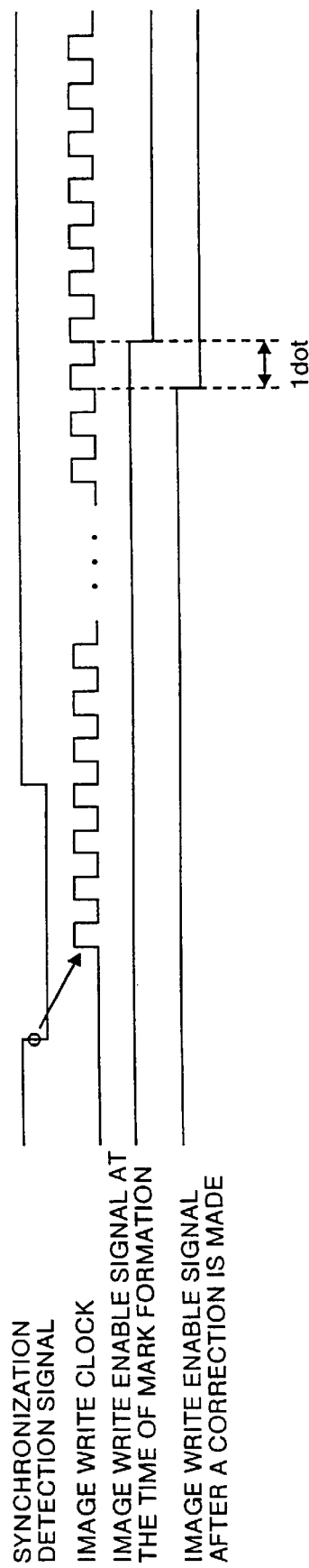
FIG. 7 is a timing chart showing operation timing of the time of correcting the write timing of the main scanning direction in the image forming apparatus.
Figure 8:
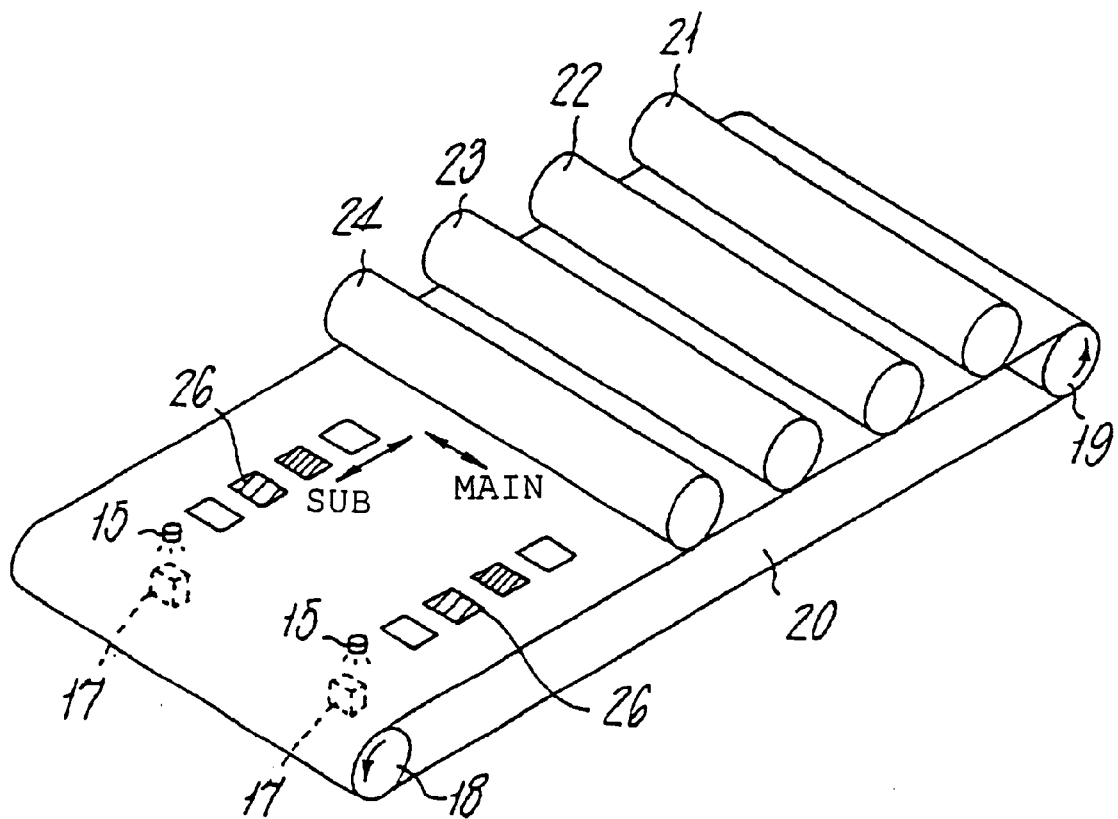
FIG. 8 is a perspective view showing the detection unit and its peripheral section of the multiple image forming apparatus described in the Japanese Patent No. 2573855.

One preferred embodiment of the present invention is explained below with reference to the attached drawings. It is assumed that the present invention is applied to the conventional color image forming apparatus shown in FIG. 2. Further, it is assumed that a main CPU performs the requests for alignment and a request for image density regulation. The main CPU monitors the number of printed papers, temperature of the surrounding, temperatures of the respective units of the color image forming apparatus, and the like, and performs the request for alignment and the request for image density regulation based on result of this monitoring. There is a possibility that the main CPU does not output the requests for alignment and the request for image density regulation at one time or at substantially one time. When the main CPU performs only the request for alignment at one time, then an alignment operation of calculation of a detection result of an alignment mark (positional deviation detection mark) and performing alignment control according to the result is performed. On the other hand, when the main CPU performs only the request for image density regulation at one time, then an image density regulation operation of calculation of a detection result of an image density regulation mark and altering a process condition and the like according to the result is performed.

Figure 9:
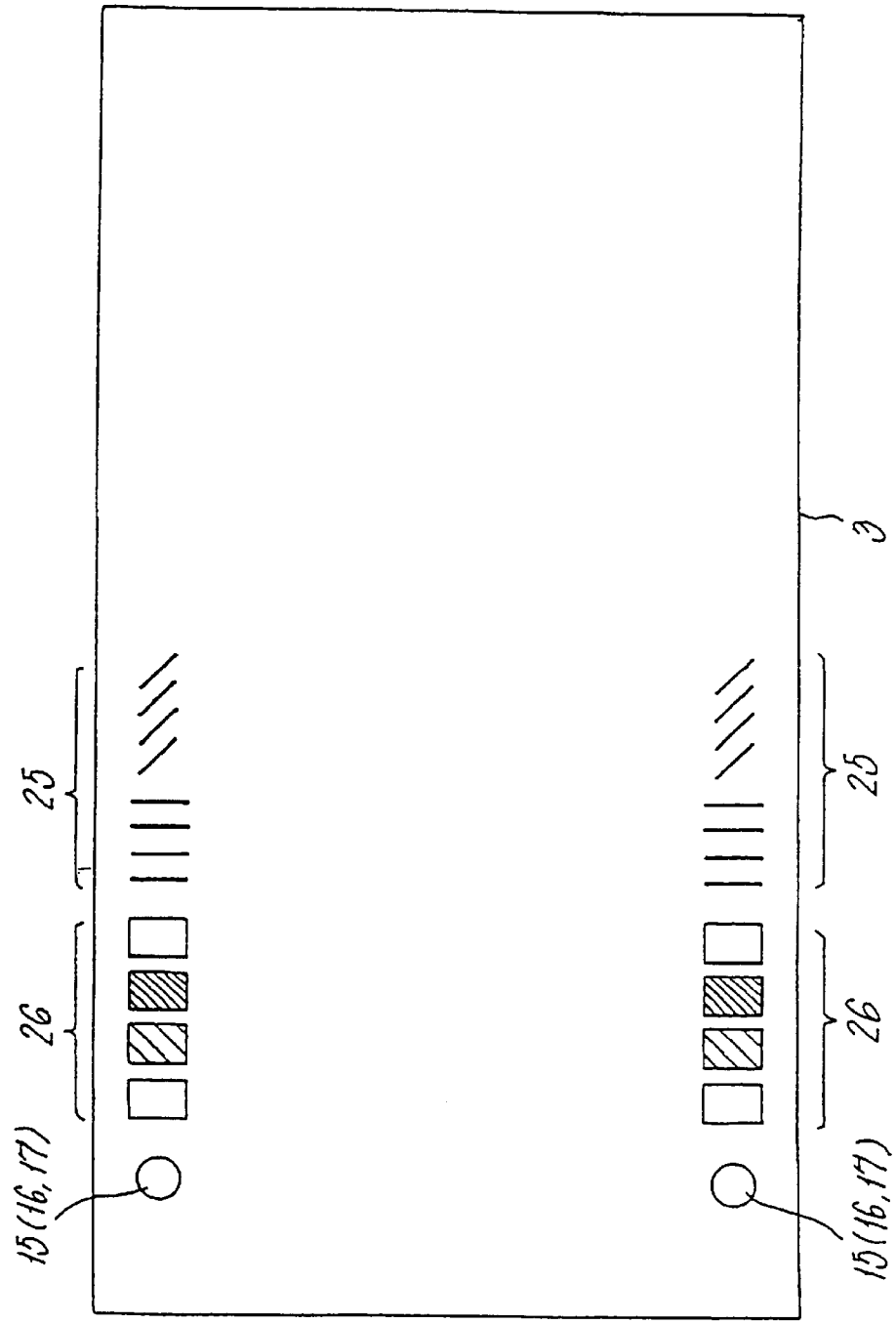
FIG. 9 is a plan view showing a state wherein the image density regulation mark and the alignment mark are formed on the conveyer belt in the embodiment according to the present invention.

If the main CPU outputs the requests for alignment and the request for image density regulation at one time or at substantially one time, then the alignment mark and the image density regulation mark are formed in the same sequence. As shown in FIG. 9, on both ends of the conveyer belt 3 (inside an image region or a region where the paper 2 does not lie) the image density regulation mark 26 and the alignment mark 25 are sequentially arranged in the conveying direction. The image density regulation mark 26 is formed upstream from the alignment mark 25 on the conveyer belt 3, and the alignment mark 25 is formed downstream from the image density regulation mark 26 on the conveyer belt 3.

Figure 10:
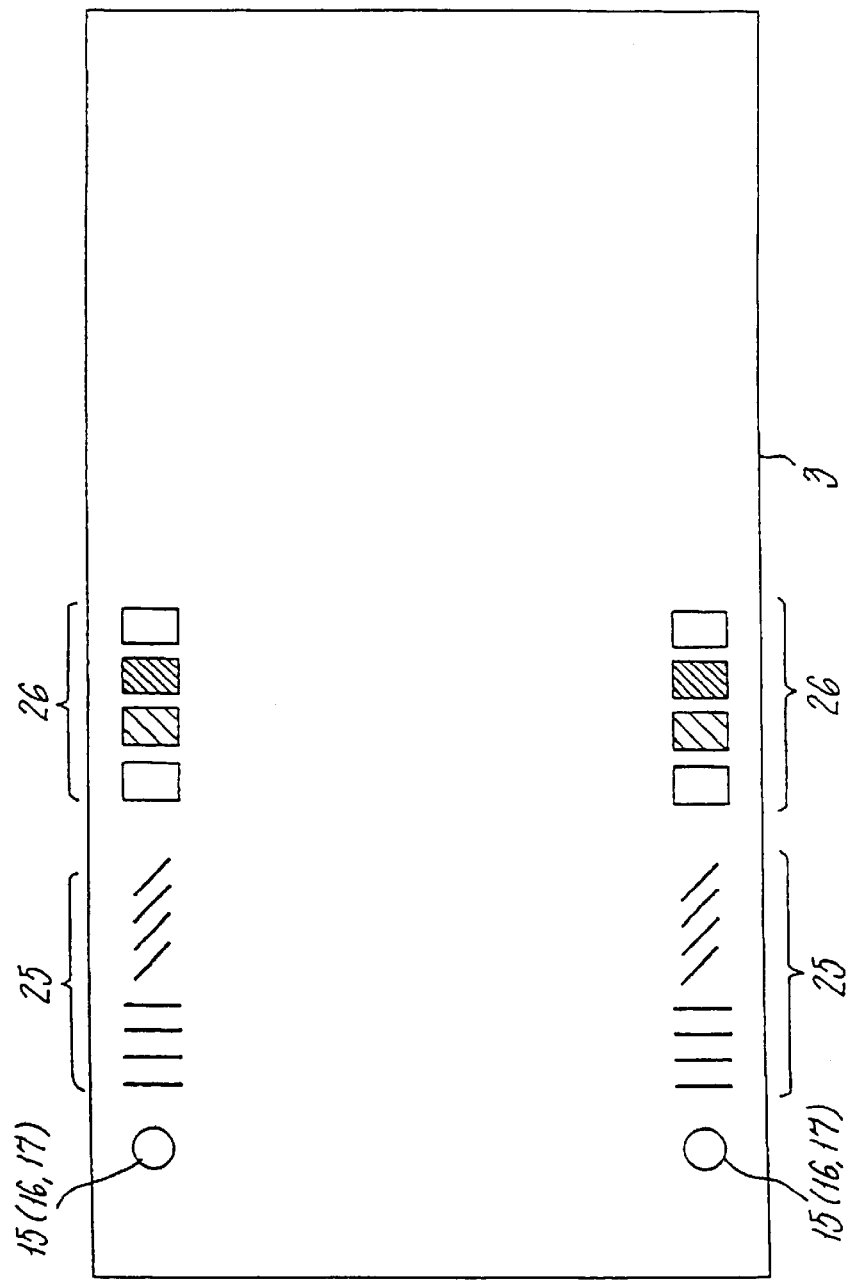
FIG. 10 is a plan view showing another example in which the image density regulation mark and the alignment mark are formed on the conveyer belt in the embodiment according to the present invention.
Figure 14:
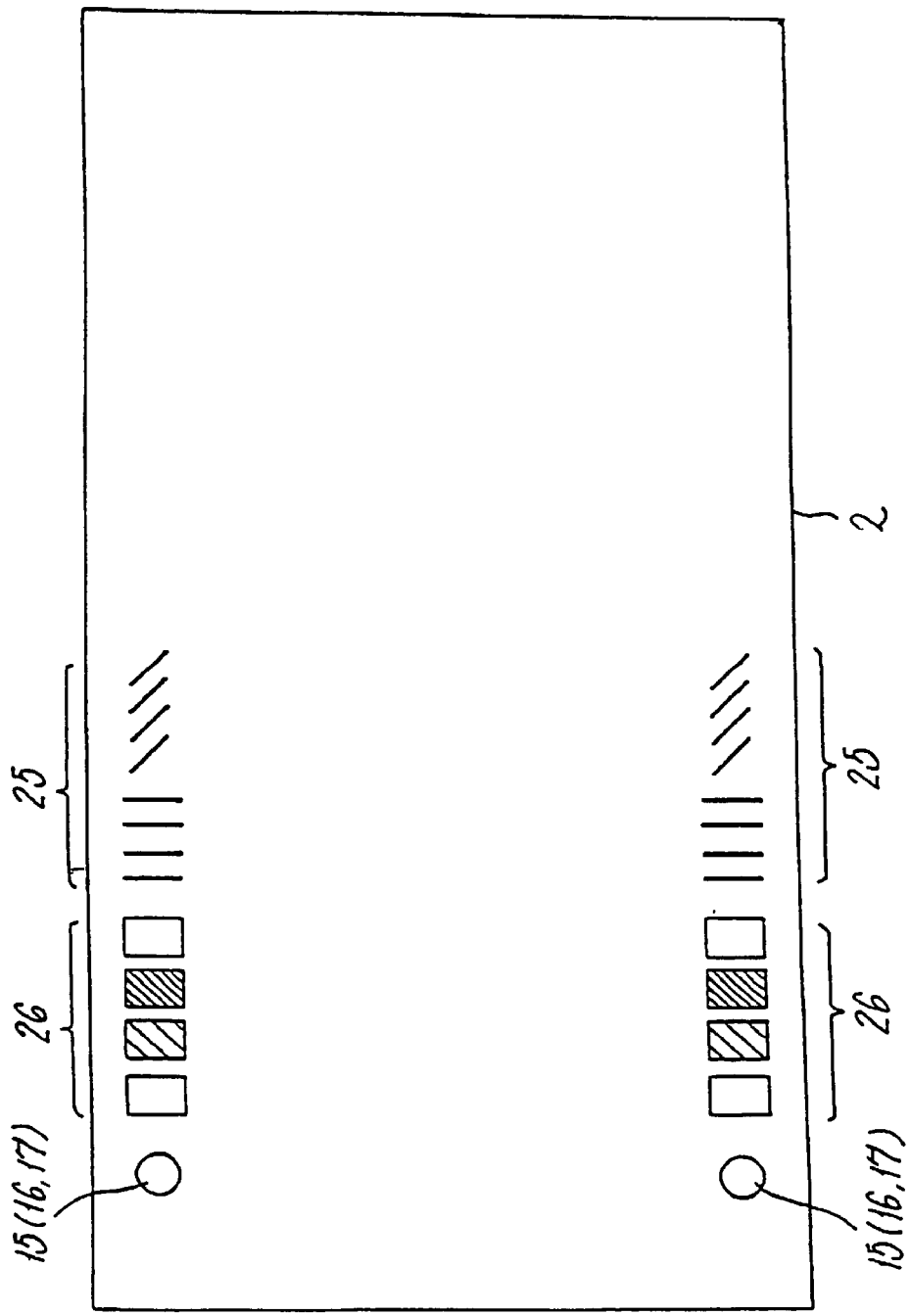
FIG. 14 is a plan view showing a state wherein the image density regulation mark and the alignment mark are formed on the recording medium or on the intermediate transfer body in the embodiment according to the present invention.
Figure 15:
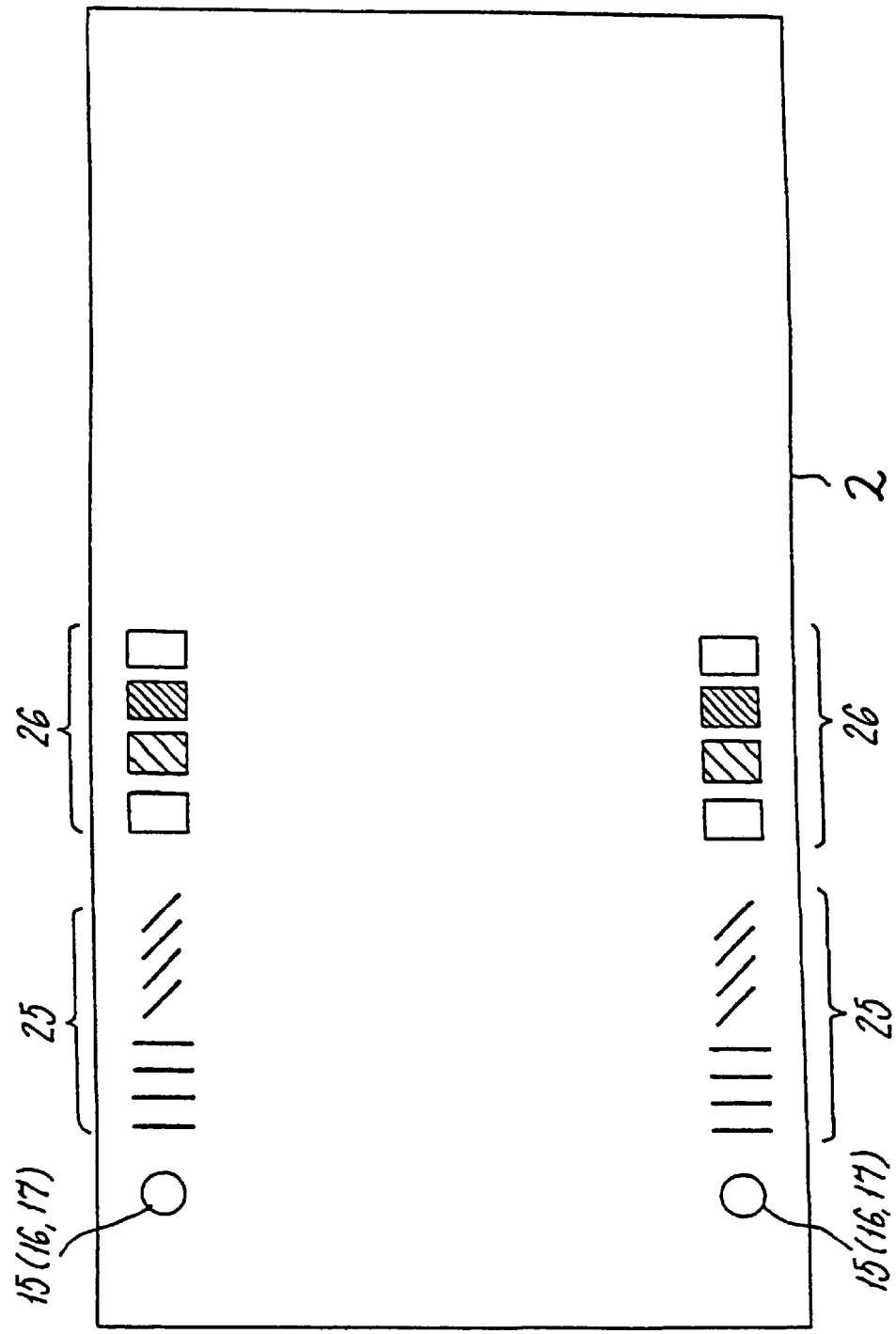
FIG. 15 is a plan view showing another example in which the image density regulation mark and the alignment mark are formed on the recording medium or on the intermediate transfer body in the embodiment according to the present invention.

The order of the image density regulation mark 26 and the alignment mark 25 is not limited to this. For example, it is allowable that the alignment mark 25 is formed upstream from the image density regulation mark 26 on the conveyer belt 3. Further, it is allowable that the alignment mark 25 is formed downstream from the image density regulation mark 26 on the conveyer belt 3 as shown in FIG. 10. Further, it is possible that the image density regulation mark 26 and the alignment mark 25 are formed alternately on the conveyer belt 3, as shown in FIGS. 9 and 10, or on at least one of the recording medium 2 and the intermediate transfer body 2' as shown in FIGS. 14 and 15.

Figure 11:
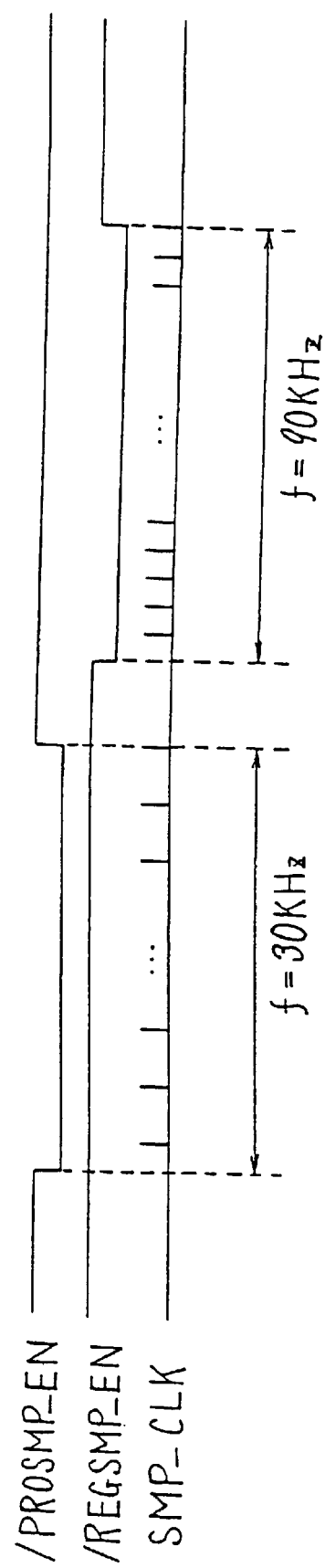
FIG. 11 is a timing chart showing timing of data sampling in the case of forming and detecting the image density regulation mark and the alignment detection mark in the embodiment according to the present invention.

FIG. 11 shows timing of data sampling in the case of forming and detecting the positional deviation detection mark 25 and image density regulation mark 26 as shown in FIG. 9. Since the image density regulation mark 26 is formed upstream from the positional deviation detection mark 25 on the conveyer belt 3, first, a sampling enable signal/PROSMP_EN making sampling of a detection signal from the image density regulation mark 26 effective becomes active, and then a sampling enable signal REGSMP_EN making sampling of a detection signal from the positional deviation detection mark 25 formed downstream from the image density regulation mark 26 on the conveyer belt 3 effective becomes active.

The frequency of a data sampling clock signal SMP_CLK is set to 30 kHz during the period in which PROSMP_EN becomes active and to 90 kHz during the period in which REGSMP_EN becomes active. This is because high resolution is required in the detection from the image density regulation mark 26. The frequency of SMP_CLK is altered for each sampling enable signal as described above to minimize data number to be handled as much as possible so that the time taken for calculation process is shortened, whereby a waiting time of a user can be shortened.

Figure 12:
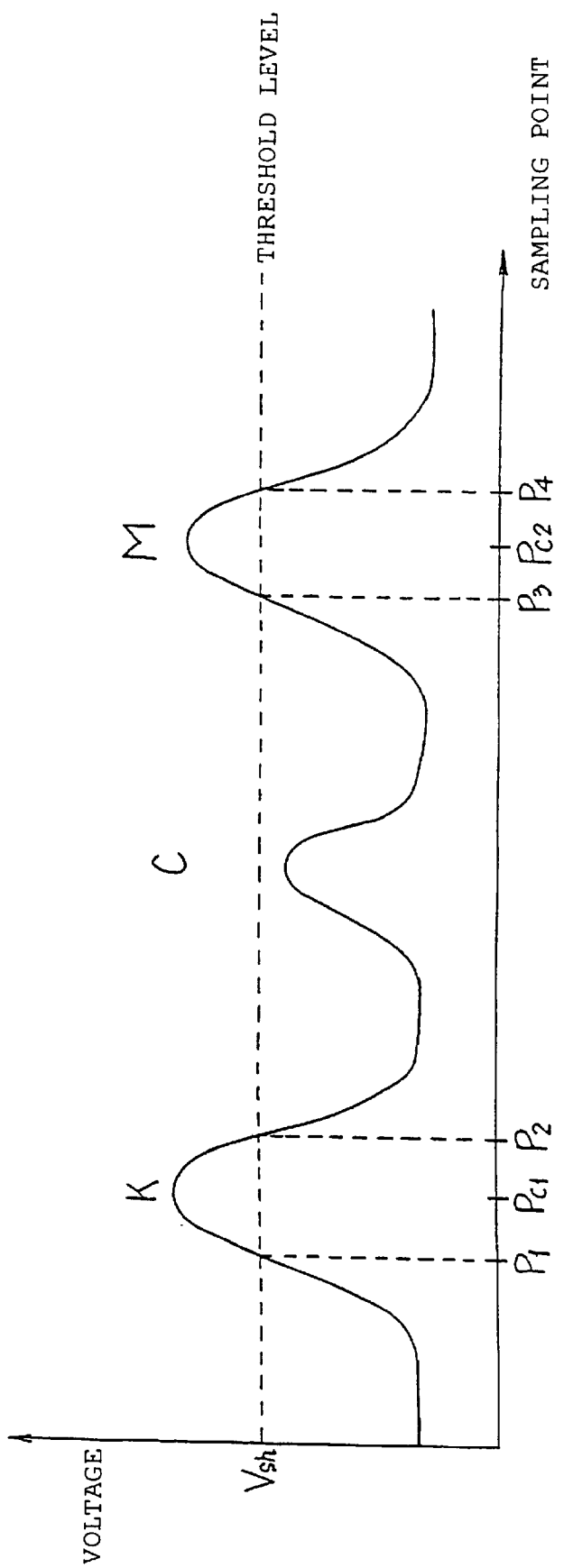
FIG. 12 is a view for explaining the embodiment according to the present invention.

There may be a case in which discrimination of the line of the positional deviation detection mark 25 becomes impossible during the formation and detection of the positional deviation detection mark 25 and image density regulation mark 26 in the same sequence. This case can occur when the image density is considerably low. For example, as shown in FIG. 12, when the centers of the lines of the respective the positional deviation detection mark 25 and image density regulation mark 26 are sought from intersections $P_1$, $P_2$, $P_3$, $P_4$, . . . between the detection signals of the positional deviation detection mark 25 and a predetermined threshold level $V_{sh}$ the line of cyan C cannot be recognized.

That is, although the line center $P_{c1}$ of the mark of black K is sought from the intersections $P_1$ and $P_2$, since the line center of the next mark becomes the line center $P_{c2}$ of the mark of magenta, $P_{c2}$ is sought from the intersections $P_3$ and $P_4$. For this type of line recognition error, after all line centers are sought, discrimination is possible depending on whether or not its number is desired number and the like.

If this type of line recognition error occurs, only the detection result of the image density regulation mark 26 is utilized and is given a predetermined arithmetic process, and according to the arithmetic process result, a process condition or the like, such as a laser power, a charge bias, a development bias, or the like, is altered into an optimal value. Then, the formation and detection of the image density regulation mark 25 are performed again so that the formation and detection of a clean image density regulation mark 25 is performed, thereby eliminating a situation in which a detection level of the image density regulation mark 26 becomes $V_{sh}$ or less, whereby the alignment can be performed securely.

Figure 1:
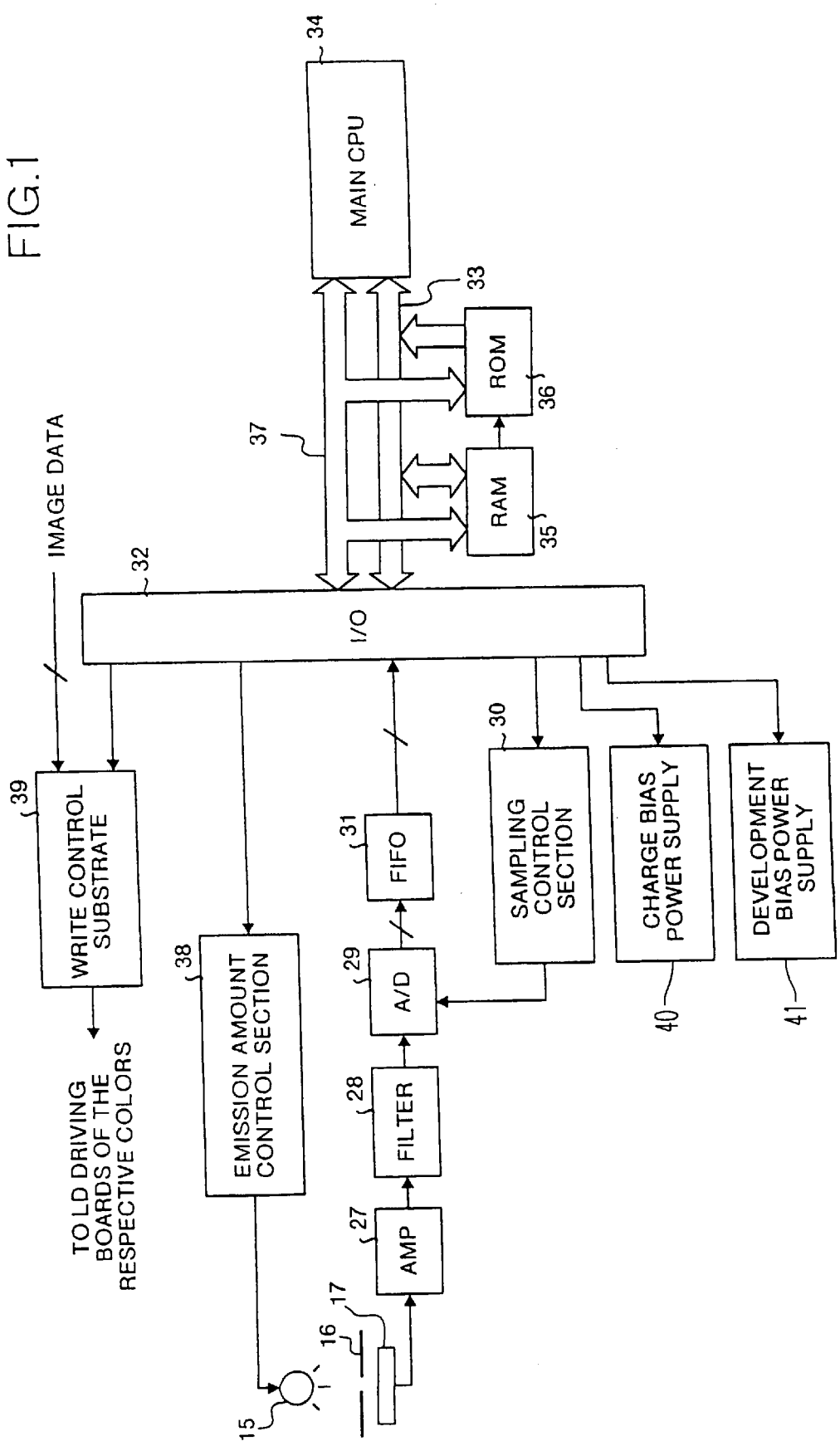
FIG. 1 is a block diagram showing the configuration of one embodiment of the present invention.

FIG. 1 shows the configuration of the present embodiment. As mentioned above, this configuration is employed in the color image forming apparatus shown in FIG. 2. The detection unit according to the present invention comprises the light emitter 15, the slit 16, and the light receiver 17. This detection unit detects the positional deviation detection mark 25 and image density regulation mark 26 formed on the conveyer belt 20 by the image forming units 1Y, 1M, 1C, and 1K for the respective colors. The detection unit is disposed between the image forming unit 1K and the fixing unit 14. The light emitter 15 is disposed in an outer side of the conveyer belt 3, and the slit 16 and the light receiver 17 are disposed in an inner side of the conveyer belt 3. The light from the light emitter 15 is received at the light receiver 17 through the transparent conveyer belt 3 and the aperture 16a of the slit 16.

The signal obtained from the light receiver 17 is amplified by an amplifier 27 and supplied to a filter 28. The filter allows only a signal component that corresponds to the detected mark to passed through to an A/D converter 29. The A/D converter 29 samples the analog signal and obtains a digital data. FIFO memory 31 stores the digital data. A sampling control section 30 controls sampling of the data by the A/D converter 29. Two sets of such a detection unit are provided on each side of the conveyer belt. Both the sets of the detection unit have the same configuration.

Thus, when the positional deviation detection mark 25 and image density regulation mark 26 is detected, a digital data is stored in the FIFO memory 31. This digital data is loaded into a main CPU 34 and a RAM 35 via an I/O port 32 through a data bus 33. Thereafter, the main CPU 34 performs arithmetic processing for calculating various kinds of positional deviation amounts and optimal process conditions. Therefore, the main CPU 34 works as an arithmetic means for calculating data from the positional deviation detection mark 25 and image density regulation mark 26 as well.

A ROM 36 stores various kinds of programs and data tables and the like, such as a program for calculating various kinds of positional deviation amounts and optimal process conditions down. The main CPU 34 appoints the address of the ROM 36, the address of the RAM 35, and various types of input-output devices through an address bus 37. The main CPU 34 monitors the detection signal from the light receiver 17 by appropriate timing and controls a light emission amount of the light emitter 15 via an emission amount control section 38 so as to securely detect degradations or the like of the conveyer belt 3 and the light emitter 15 even when the degradation occurs so that the level of the light receiving signal from the light receiver 17 is constant at all times.

The main CPU34 alters a main scanning direction resist, a sub-scanning direction resist, and a magnification error by setting for a write control substrate 39 as a write control means controlling writing by the exposure units 10Y, 10M, 10C, and 10K based on various correction amounts sought in the arithmetic processing of the data from the positional deviation detection mark 25 on the occasion of an alignment so as to correct a positional deviation of another color against the standard color. The write control substrate 39 is provided with a device which can set an output frequency very finely, for example, a clock generator utilizing a VCO (Voltage Controlled Oscillator) or the like, for each color including the standard color and employs its output as an image clock.

The main CPU 34 sets process conditions of the laser powers of the exposure units 10Y, 10M, 10C, and 10K, charge biases of the charging units 9Y, 9M, 9C, and 9K, development biases of the development units 11Y, 11M, 11C, and 11K, and the like for the write control substrate 39, a charge bias power supply 40 applying charge biases to the charging units 9Y, 9M, 9C, and 9K, a development bias power supply 41 applying development biases to the development units 11Y, 11M, 11C, and 11K, and the like, respectively, based on various correction amounts sought in the arithmetic processing of the data from the image density regulation mark 26 on the occasion of an image density regulation so as to control the process conditions. Thus, the main CPU 34 constitutes a control means for controlling the main scanning direction resist, the sub-scanning direction resist, the magnification, and the process condition.

Figure 13:
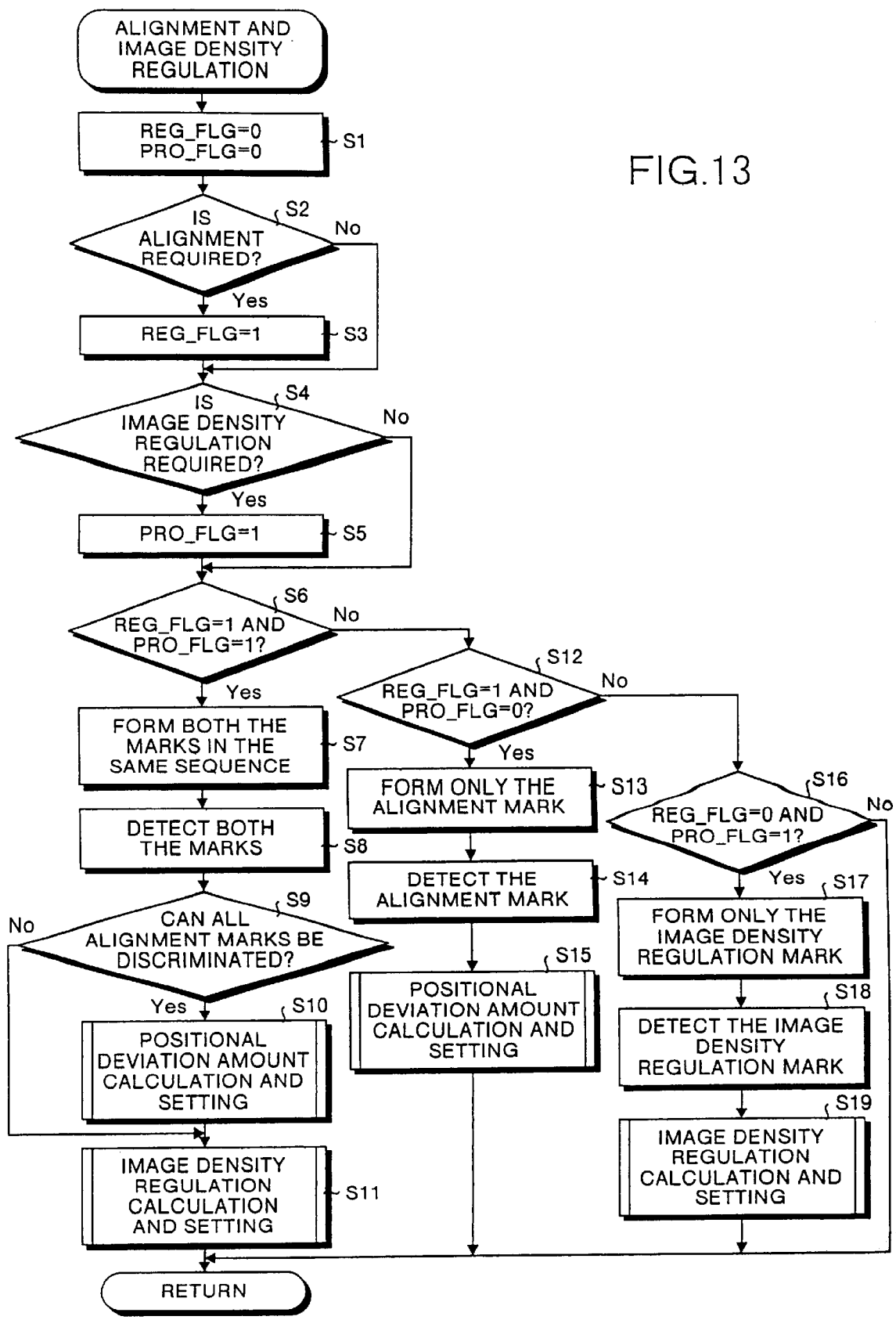
FIG. 13 is a flowchart showing a processing flow of the time of an alignment and an image density regulation in the embodiment according to the present invention.

FIG. 13 shows a processing flow of the time of the alignment and the image density regulation in the present embodiment. The main CPU 34 initializes (zero substitutes) a flag REG_FLG showing that the alignment is required and a flag PRO_FLG showing that the image density regulation is required (step S1). Then, the main CPU 34 determines whether or not the alignment is required (step S2) and sets a flag REG_FLG to 1 (one) (step S3) when the alignment is required to proceed to a step S4. The main CPU 34 proceeds to the step S4 when the alignment is not required.

The main CPU 34 then determines whether or not the image density regulation is required (step S4) and sets a flag PRO_FLG to 1 (one) (step S5) when the image density regulation is required to proceed to a step S6. The main CPU 34 proceeds to the step S6 when the image density regulation is not required. The main CPU 34 then determines whether or not the flag REG_FLG is 1 and the flag PRO_FLG is 1 (step S6) and controls each section of the present embodiment when REG_FLG is 1 and PRO_FLG is 1 to form both marks 25, 26 in the same sequence (step S7). Both the positional deviation detection mark 25 and image density regulation mark 26 are detected by the detection unit, and the detection signal from this detection unit is stored in the FIFO memory 31 via the amplifier 27, the filter 28, and the A/D converter 29. After the whole detection for the marks is completed, the data stored in the FIFO memory 31 are loaded into the main CPU 34 and the RAM 35 via the I/O port 32 by the data bus 33 (step S8).

Next, the main CPU 34 determines whether or not all alignment marks 25 can be discriminated through the data from the alignment marks 25 (step S9). When all the alignment marks 25 can be discriminated, the main CPU 34 performs arithmetic processing of the data from the alignment marks 25 and setting for the write control substrate 39 described above (step S10) and performs arithmetic processing of the data from the image density regulation mark 26 and setting for the write control substrate 39, the charge bias power supply 40, the development bias power supply 41, and the like described above (step S11) to return. The main CPU 34 proceeds to step S11 when all the alignment marks 25 cannot be discriminated.

When the flags REG_FLG and PRO_FLG are both not equal to 1, the main CPU 34 determines whether the flag REG_FLG is equal to 1 and whether the flag PRO_FLG is equal to 0 (zero) (step S12). When the flag REG_FLG is equal to 1 and the flag PRO_FLG is equal to 0, the main CPU 34 controls each section of the present embodiment to form only the alignment mark 25 (step S13). The alignment mark 25 is detected by the detection unit, and the detection signal from this detection unit is stored in the FIFO memory 31 via the amplifier 27, the filter 28, and the A/D converter 29. The digital data stored in the FIFO memory 31 are loaded into the main CPU 34 and the RAM 35 through the I/O port 32 by the data bus 33 (step S14) after the whole detection of the alignment mark 25 is completed. The main CPU 34 then performs the arithmetic processing of the data from the alignment mark 25 and the setting for the write control substrate 39 as described above (step S15) to return.

When the flag REG_FLG is not equal to 1 and the flag PRO_FLG is not equal to 0, the main CPU 34 determines whether the flag REG_FLG is equal to 0 and whether the flag PRO_FLG is equal to 1. When the flag REG_FLG is equal to 0 and the flag PRO_FLG is equal to 1 (step S16), the main CPU 34 controls each section of the present embodiment to form only the image density regulation mark 26 (step 17). The image density regulation mark 26 is detected by the detection unit, and the detection signal from this detection unit is stored in the FIFO memory 31 vial the amplifier 27, the filter 28, and the A/D coverter 29. The digital data stored in the FIFO memory 31 are loaded into the main CPU 34 and the RAM 35 through the I/O port 32 by the data bus 33 (step 18) after the whole detection of the image density regulation mark 26 is completed. The main CPU 34 then performs the arithmetic processing of the data from the image density regulation mark 26 and the setting for the write control substrate 39, the charge bias power supply 40, the development biaspower supply 41, and the like as described above (step S19) to return. When the flag REG_FLG is not equal to 0 and the flag PRO_FLG si not equal to 1, the main CPU 34 returns.

With this embodiment, in the color image forming apparatus transferring in superimposing one after another images of the plurality of colors formed in the plurality of image forming units 1Y, 1M, 1C, and 1K forming the plural colors of images, respectively, on the transfer paper 2 as a recording medium on the conveyer belt 3 as a conveyer body to obtain a color image on the recording medium, forming a positional deviation detection mark 25 on the conveyer body 3 according to the alignment requirement to detect the positional deviation detection mark 25, performing an alignment for each color by calculating a positional deviation amount of a color against a standard color according to its detection result and correcting a positional deviation of the color against the standard color, forming the image density regulation mark 26 on the conveyer body 2 according to the image density control requirement to detect the image density regulation mark 26, and regulating image density for each color according to its detection result, since the color image forming apparatus comprises the image forming units 1Y, 1M, 1C, and 1K, the detection unit, and the main CPU 34 as means forming and detecting the positional deviation detection mark 25 and the image density regulation mark 26 in the same sequence when the image density control and the alignment are simultaneously required, a waiting time of a user can be shortened.

Further, when one of either the image density control or the alignment are required, since formation and detection of one of either the positional deviation detection mark 25 or the image density regulation mark 26 is performed according to the one requirement, it is not necessary to form and detect both of the positional deviation detection mark and the image density regulation mark when one of either the image density control or the alignment is required, whereby a toner consumption can be restrained as much as possible, reducing the running cost.

Moreover, the frequency for sampling the detection signal of the image density regulation mark 26 and the frequency for sampling the detection signal of the positional deviation detection mark 25 are made different. The frequency for sampling the detection signal of the image density regulation mark 26 is less than the frequency for sampling the detection signal of the positional deviation detection mark 25. As a result, the time taken for calculation can be shortened by minimizing the data number handled as much as possible, whereby the waiting time of a user can be shortened.

Furthermore, when the discrimination of the positional deviation detection mark 25 is impossible, only the image density regulation for each color is performed, i.e. the alignment for each color is not performed. When the discrimination is possible, the image density regulation for each color and the alignment for each color are performed. As a result, the alignment can be securely performed. Further, when the discrimination of the positional deviation detection mark 25 is impossible, the alignment for each color is performed after the image density regulation for each color is performed. As a result, a clean positional deviation detection mark can be formed after the image density is regulated, whereby the alignment can be securely performed.

The present invention is not limited to the embodiment described above and. For example, this invention can be applied to a color image forming apparatus transferring in superimposing one after another images of a plurality of colors formed in a plurality of image forming units on an intermediate transfer body to transfer the images on a recording medium by a transfer means to fix them by a fixing unit, forming a positional deviation detection mark on the intermediate transfer body to detect the positional deviation detection mark, performing an alignment for each color by calculating a positional deviation amount of a color against a standard color according to its detection result and correcting a positional deviation of the color against the standard color, forming an image density regulation mark on the intermediate transfer body according to an image density control requirement to detect the image density regulation mark, and regulating image density for each color according to its detection result.

The present document incorporates by reference the entire contents of Japanese priority document, 11-352745 filed in Japan on Dec. 13, 1999.

Although the invention has been described with respect to a specific embodiment for a complete and clear disclosure, the appended claims are not to be thus limited but are to be construed as embodying all modifications and alternative constructions that may occur to one skilled in the art which fairly fail within the basic teaching herein set forth.

What is claimed is:

1. A color image forming apparatus superimposing one after another and transferring images of a plurality of colors formed in a plurality of image forming units forming the plural colors of images, respectively, on a recording medium or an intermediate transfer body on a conveyer body to obtain a color image on the recording medium, forming a positional deviation detection mark on the recording medium or the intermediate transfer body according to an alignment requirement to detect the positional deviation detection mark, performing an alignment for each color by calculating a positional deviation amount of a color against a standard color according to its detection result and correcting a positional deviation of the color against the standard color, forming an image density regulation mark on the conveyer body or the intermediate transfer body according to an image density control requirement to detect the image density regulation mark, and regulating image density for each color according to its detection result, wherein the color image forming apparatus comprises a unit which forms and detects the positional deviation detection mark and the image density regulation mark in the same sequence when the image density control and the alignment are simultaneously required.

2. The color image forming apparatus according to claim 1, wherein when a request for only one out of the image density control and alignment is received, then only the mark corresponding to the requested image density control or the alignment is formed and detected.

3. The color image forming apparatus according to claim 1, wherein a frequency for sampling a detection signal of the image density regulation mark and a frequency for sampling a detection signal of the positional deviation detection mark are different, and the frequency for sampling the detection signal of the image density regulation mark is smaller than the frequency for sampling the detection signal of the positional deviation detection mark.

4. The color image forming apparatus according to claim 1, wherein the detection result of the positional deviation detection mark is discriminated, and when the discrimination is impossible, only the image density regulation for each color is performed so that the alignment for each color is not performed, and when the discrimination is possible, the image density regulation for each color and the alignment for each color are performed.

5. The color image forming apparatus according to claim 4, wherein when the discrimination is impossible, the alignment for each color is performed after the image density regulation for each color is performed.

6. A color image forming apparatus comprising:
a plurality of image forming units, each one of said image forming units corresponding to a different color, which form superimposing image of different colors on a recording medium or on an intermediate transfer body;
a conveyer unit having a conveyer belt which supports the recording medium, conveys the recording medium to the vicinity of each of the image forming units, and dispatches at least one of the recording medium and the intermediate transfer body to outside of said image forming apparatus when the image formation by said image forming units is completed;

a positional deviation detection mark formation control unit which, when receiving a request, orchestrates said conveyer unit and said image forming units to form a positional deviation detection mark of respective color on either said conveyer belt or said intermediate transfer body;

an image density regulation mark formation control unit which, when receiving a request, orchestrates said conveyer unit and said image forming units to form an image density regulation mark of respective color on either said conveyer belt or said intermediate transfer body;

a mark detection unit which detects positions of the positional deviation detection marks or densities of the image regulation marks when the positional deviation detection marks or densities of the image density regulation marks are formed on said conveyer belt or said intermediate transfer body;

an alignment unit which receives the positions of each of the positional deviation detection marks detected by said mark detection unit, based on the position of a predetermined color calculates a deviation in the positions of the positional deviation detection marks of the other colors, and provides a control so that the positional deviation detection marks of respective colors are formed at specific positions with respect to the positional deviation detection mark of the predetermined color; and a density regulating unit which receives the densities of the image density regulation marks of different colors detected by said mark detection unit, based on a predetermined density of each color the calculates a deviation in the density of each color, and provides a control so that the image density regulation marks of all the colors having the predetermined densities are formed, wherein when the request for formation of the positional deviation detection marks and the request for the formation of the image density regulation marks is received at the same time or at substantially the same time, said positional deviation detection mark formation control unit and said image density regulation mark formation control unit orchestrate said conveyer unit and said image forming units to form the positional deviation detection marks and the image density regulation marks in continuation.

7. The color image forming apparatus according to claim 6, said mark detection unit uses signals having different frequencies when detecting the positional deviation detection marks and when detecting the image density regulation marks.

8. The color image forming apparatus according to claim 6, said mark detection unit uses a signal having a first frequency when detecting the positional deviation detection marks, and uses a signal having a second frequency which is smaller that the first frequency when detecting the image density regulation marks.

9. The color image forming apparatus according to claim 6, wherein when said mark detection unit can not detect the positions of the positional deviation detection marks but can detect the densities of the image density regulation marks, said alignment unit does not perform any control, and said density regulating unit provides the control to correct the deviation in the densities of each color.

10. The color image forming apparatus according to claim 9, wherein once the control to correct the deviation in the densities of each color by said density regulating unit has completed, said alignment unit provides the control so that the positional deviation detection marks of respective colors are formed at specific positions with respect to the positional deviation detection mark of the predetermined color.

11. The color image forming apparatus according to claim 6, wherein said alignment unit provides the control so that the positional deviation detection marks of respective colors are formed at specific positions with respect to the positional deviation detection mark of the predetermined color by controlling the speed of movement of at least one of said conveyer belt, said recording medium, and said intermediate transfer body.

12. The color image forming apparatus according to claim 11, wherein said alignment unit provides the control so that the positional deviation detection marks of respective colors are formed at specific positions with respect to the positional deviation detection mark of the predetermined color by controlling an exposure unit and adjusting the position where the light is illuminated on a photosensitive body.

13. The color image forming apparatus according to claim 6, wherein each one of said image forming unit having, a photosensitive body having a shape of a drum;

a charging unit, disposed in the vicinity of said photosensitive body, which electrically charges said photosensitive body;

an exposure unit which illuminates a light on said photosensitive body;

a development unit which develops an electrostatic latent image on said photosensitive body to form a toner image of corresponding color; and a cleaner unit which cleans said photosensitive body after the image is formed on the recording medium.

14. The color image forming apparatus according to claim 6, wherein said mark detection unit having, a light emitter;

a slit having a shape in correspondence to the shape of the positional deviation detection marks and the image density regulation marks;

a light receiver; and a calculation unit which performs different types of calculations.

15. A color image forming method comprising the steps of:

forming superimposing image of different colors on a recording medium or on an intermediate transfer body using a plurality of image forming units, each one of said image forming unit corresponding to a different color;

conveying the recording medium to the vicinity of each of the image forming units using a conveyer belt when forming the image of a respective color;

forming a positional deviation detection mark of respective color, when receiving a request, using said image forming units, on either said conveyer belt or said intermediate transfer body;

forming an image density regulation mark of respective color, when receiving a request, using said image forming units, on either said conveyer belt or said intermediate transfer body;

detecting the positions of the positional deviation detection marks or densities of the image density regulation marks when the positional deviation detection marks or the image density regulation marks are formed on said conveyer belt or said intermediate transfer body;

calculating, based on the position of a predetermined color, a deviation in the positions of the positional deviation detection marks of the other colors;

providing a control so that the positional deviation detection marks of respective colors are formed at specific positions with respect to the positional deviation detection mark of the predetermined color;

calculating, based on a predetermined density of each color, a deviation in the density of each color; and providing a control so that the image density regulation marks of all the colors having the predetermined densities are formed, wherein when the request for formation of the positional deviation detection marks and the request for the formation of the image density regulation marks is received at the same time or at substantially the same time, the steps of formation of the positional deviation detection marks and the image density regulation marks are preformed in continuation.

* * * * *